(12) United States Patent
Miller

(10) Patent No.: US 10,678,014 B2
(45) Date of Patent: Jun. 9, 2020

(54) MID-SPAN CLAMP FOR AERIAL FIBER OPTICAL CABLE SYSTEM

(71) Applicant: Corning Research & Development Corporation, Corning, NY (US)

(72) Inventor: Allen Michael Miller, Lenoir, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/426,785

(22) Filed: May 30, 2019

(65) Prior Publication Data
US 2019/0278041 A1    Sep. 12, 2019

Related U.S. Application Data

(62) Division of application No. 15/811,803, filed on Nov. 14, 2017, now Pat. No. 10,338,335.

(60) Provisional application No. 62/422,832, filed on Nov. 16, 2016.

(51) Int. Cl.
*G02B 6/44* (2006.01)
*G02B 6/48* (2006.01)

(52) U.S. Cl.
CPC .......... *G02B 6/4478* (2013.01); *G02B 6/483* (2013.01); *G02B 6/4429* (2013.01); *G02B 6/4433* (2013.01)

(58) Field of Classification Search
CPC .............................. G02B 6/4478; G02B 6/483
See application file for complete search history.

(56) References Cited

U.S. PATENT DOCUMENTS

| 6,493,500 | B1 | 12/2002 | Oh et al. | |
|---|---|---|---|---|
| 9,362,635 | B2 | 6/2016 | Wild et al. | |
| 2003/0080555 | A1* | 5/2003 | Griffioen | F16L 41/023 |
| | | | | 285/133.11 |
| 2004/0035984 | A1 | 2/2004 | Franks et al. | |
| 2008/0253722 | A1* | 10/2008 | Gronvall | G02B 6/4475 |
| | | | | 385/103 |
| 2014/0023159 | A1 | 1/2014 | Huang et al. | |
| 2014/0231598 | A1* | 8/2014 | Miller | H02G 7/053 |
| | | | | 248/63 |
| 2016/0003376 | A1* | 1/2016 | Sakmar | G02B 6/4471 |
| | | | | 248/63 |

(Continued)

OTHER PUBLICATIONS

Thomas & Betts; DIAMOND®/SACHS®; Universal Messanger Drop Wire Clamp—CATV; 2004; 36 Pages.

(Continued)

*Primary Examiner* — Chris H Chu
(74) *Attorney, Agent, or Firm* — Wiliam D. Doyle

(57) ABSTRACT

A mid-span optical fiber cable support system is provided. The system includes a mid-span clamp system engaging a main span cable to support a mid-span later drop cable run. The mid-span clamping system includes a main span cable clamp engaging the main span cable, and a drop cable clamp engaging the drop cable. The drop cable clamp is supported from the main span cable such that the second portion of the drop cable extends away from the main span cable such that a load applied by the drop cable at the drop cable clamp is substantially perpendicular to the preferential bend axis of the main span cable. In addition, the main span cable clamp includes a bend strain reducing curved surface.

10 Claims, 3 Drawing Sheets

(56) References Cited

U.S. PATENT DOCUMENTS

| | | | |
|---|---|---|---|
| 2017/0235082 A1* | 8/2017 | Thigpen | G02B 6/4471 385/136 |
| 2018/0031795 A1 | 2/2018 | Al Ghossein et al. | |
| 2018/0136428 A1 | 5/2018 | Miller | |

OTHER PUBLICATIONS

International Search Report and Written Opinion of the International Searching Authority; PCT/US17/61881; dated Jul. 2, 2018; 11 Pages; ISA/US Commissioner for Patents.

* cited by examiner

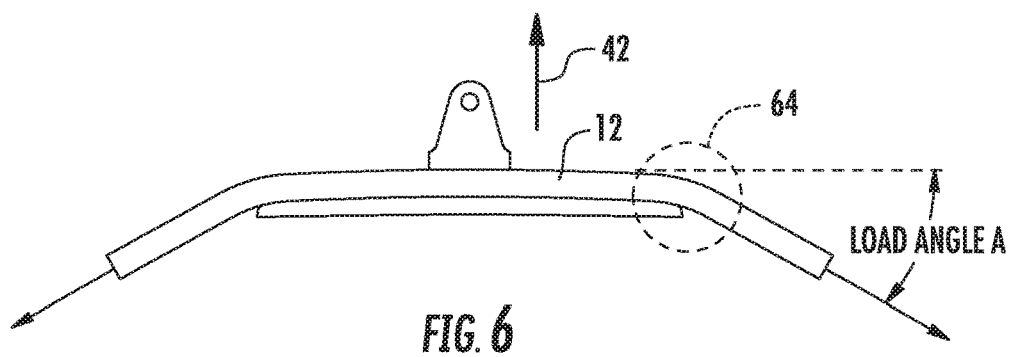
FIG. 6
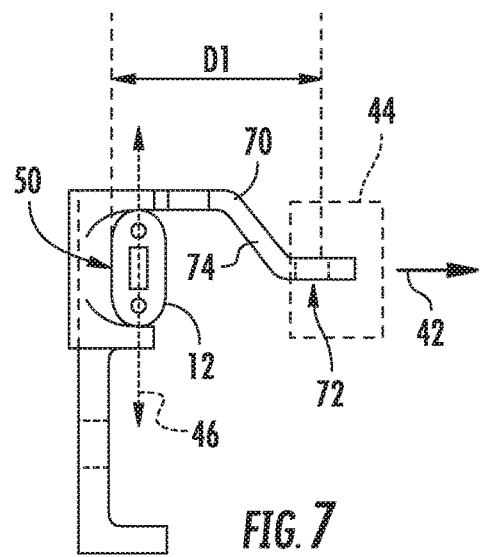
FIG. 7
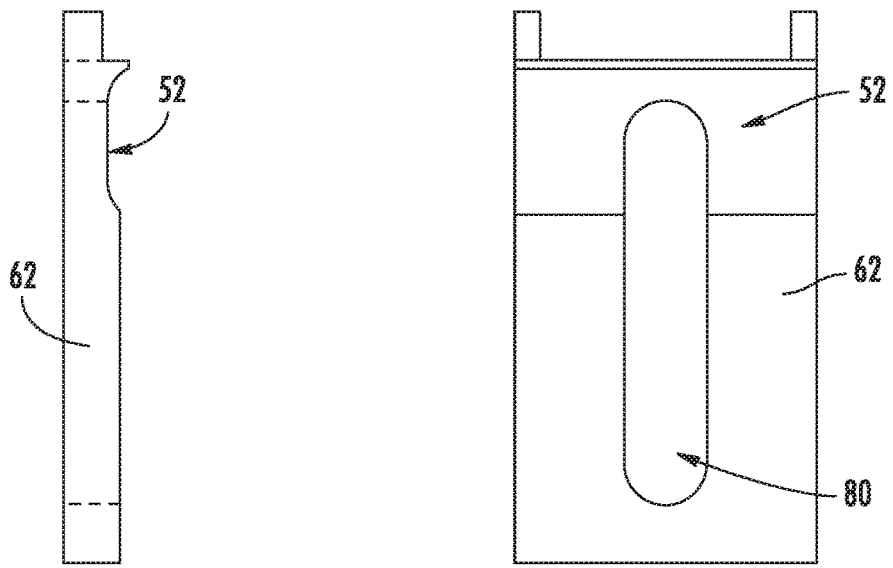
FIG. 8
FIG. 9

MID-SPAN CLAMP FOR AERIAL FIBER OPTICAL CABLE SYSTEM

CROSS-REFERENCE TO RELATED APPLICATIONS

This application is a divisional of U.S. patent application Ser. No. 15/811,803, filed on Nov. 14, 2017, which claims the benefit of priority to U.S. Provisional Application No. 62/422,832, filed on Nov. 16, 2016, which is incorporated herein by reference.

BACKGROUND

The disclosure relates generally to optical fiber cable support systems and more particularly to a mid-span optical fiber cable support system configured to support a drop cable with preferential bend characteristics while reducing bend strain generated from the mid-span supported drop cable.

Optical fiber is increasingly being used for a variety of applications, including but not limited to broadband voice, video, and data transmission. Optical networks may use fiber optic cables in aerial and/or buried applications and each have special needs. For example, aerial applications require hardware such as suspension clamps for hanging the cables under the tension of their own weight along with any environmental effects. In some networks a drop cable may be suspended from the main span cable at a mid-span location to distribute the fiber network outward from the main span cable at the mid-span location.

SUMMARY

One embodiment of the disclosure relates to a mid-span optical fiber cable support system. The support system includes a main span cable including at least one optical fiber and having a preferential bend characteristic such that the main span cable defines a preferential bend axis. The main span cable supported at two separated supports along a length of the main span cable. The support system includes a drop cable including at least one optical fiber, and the drop cable has a first section extending along a portion of the length of the main span cable and a second portion extending away from the main span cable at a position between the two separated supports. The support system includes a mid-span clamp system engaging the main span cable. The mid-span clamp including a main span cable clamp engaging the main span cable and a drop cable clamp engaging the drop cable. The drop cable is supported from the main span cable such that the second portion of the drop cable extends away from the main span cable such that a drop cable load applied at the drop cable clamp is substantially perpendicular to the preferential bend axis of the main span cable.

Another embodiment of the disclosure relates to a bend-strain reducing mid-span drop cable support system. The support system including a main span cable clamp and a drop cable clamp supported from the main span cable clamp. The main span cable clamp includes a first engagement surface and a second engagement surface opposing the first engagement surface such that a body of a main span cable is engageable between the first and second engagement surfaces. The drop cable clamp is configured to support a drop cable in a position extending away from the first engagement surface. The first engagement surface has a height and a length greater than the height. The first engagement surface is a curved surface, convex relative to the drop cable clamp, and the curved surface defines a radius of curvature R1 and an angle θ. R1 is between 100 mm and 500 mm, and θ is between 3 degrees and 10 degrees.

Another embodiment of the disclosure relates to a mid-span drop cable support system. The mid-span drop cable support system includes a main span cable clamp. The main span cable clamp includes a first engagement surface having a height and a length greater than the height. The first engagement surface includes a convex curved section. The main span cable clamp includes a second engagement surface opposing the first engagement surface. The mid-span drop cable support system includes a support bracket extending outward and perpendicularly away from the first engagement surface. The mid-span drop cable support system includes a drop cable clamp supported from the support bracket. The convex curved section is convex relative to the drop cable clamp. The support bracket is shaped such that the drop cable clamp is located below an upper edge of the first engagement surface and above a lower edge of the first engagement surface.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is an exemplary schematic view showing high bend strain within a main span cable caused by an uncurved/low curvature engagement surface.

FIG. 7 is a side view of a portion of mid-span clamp system showing a main span cable engaged with a curved engagement surface according to an exemplary embodiment.

FIG. 8 is a side view of a mid-span clamp system component defining an opposing engagement surface according to an exemplary embodiment.

FIG. 9 is a front view of a mid-span clamp system component defining an opposing engagement surface according to an exemplary embodiment.

DETAILED DESCRIPTION

Figure 1:
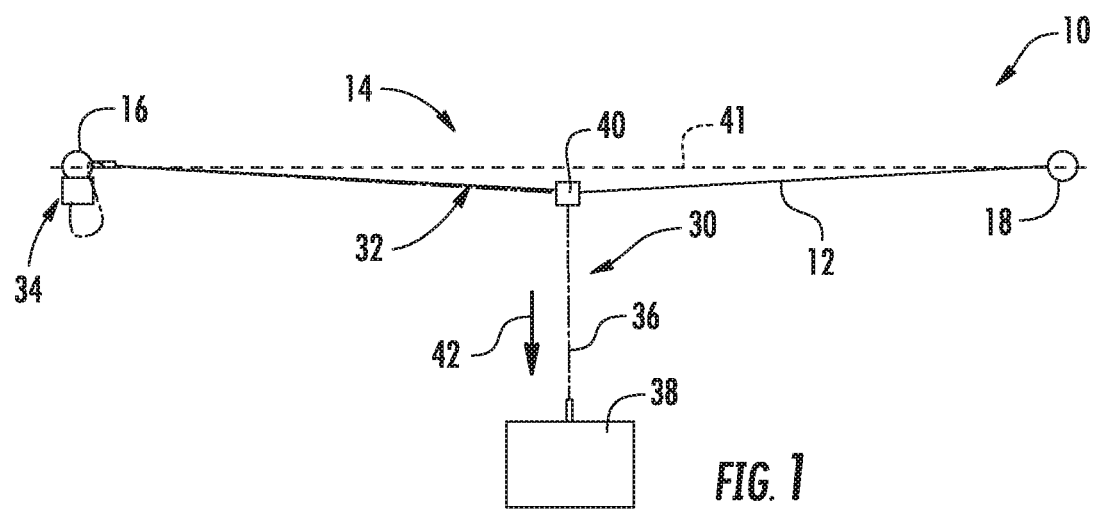
FIG. 1 shows a schematic top plan view of a mid-span optical fiber cable support system according to an exemplary embodiment.

Referring generally to the figures, various embodiments of a mid-span drop cable support system are shown. In general, in some optical cable distribution networks, a main span cable is suspended in the air between two fixed points (e.g., from fixed points on distribution poles, utility poles, etc.). A mid-span drop cable support system includes a clamp that engages the main span cable at a mid-span location (e.g., a location suspended along the length of the main span cable between the distribution poles) to support a drop cable run outward to serve a location from the mid-span location. Main span cables (e.g., all-dielectric self-supporting (ADSS) aerial system with cable strength members that are generally glass reinforced plastic rods) have maximum allowable strain limits. However, conventional mid-span clamping systems transfer the concentrated loading resulting from the lateral drop cable run to the main span in a manner that unnecessarily increases bending strain in the main span cable.

Accordingly, as discussed herein, a mid-span clamp and support system includes a main span cable clamp with specifically designed geometry that reduces bend strain that otherwise would be generated by loading from the mid-span lateral drop cable run. In general, the mid-span clamp discussed herein has design features to minimize the bending strain in the main span by aligning the main span cable in the most favorable orientation and by supporting the main span with large radii contact regions. Specifically, the main span cable clamp discussed herein includes a convex curved engagement surface having a sufficiently curved surface to provide contact and support to the main span cable under the loading generated by the mid-span position of the lateral drop cable run. This curvature is specifically designed to eliminate a sharp transition (or discontinuity) at the mid-span clamp under the drop cable loading which otherwise creates a concentration of bending strain.

In addition, the a mid-span clamp and support system is configured to position the drop cable clamp (and consequently the drop cable) relative to the main span clamp and the main span cable in a manner that reduces bending strain that may otherwise be experienced. Specifically, the mid-span clamp and support system is configured such that the load vector from the mid-span lateral extension of the drop cable is substantially perpendicular to the preferential bend axis of the main span cable, which Applicant has found helps limit bending strain experienced in the main span cable. As used herein, "preferential bend characteristic(s)" describe cables that have a major and a minor moment of inertia along different planes with strong and weak bending axes respectively. Applicant has discussed that through the strain limiting clamp system design discussed herein, mid-span drop cable runs can be supported directly from ADSS main span cables without the need for separate steel messenger wires typically used in mid-span drop cable distribution. By limiting bending strain experienced by the main span cable due to the loading of the drop cable, the mid-span clamp and support system discussed herein allows for longer length main span lengths because more of the maximum allowable strain in the main span cable can be allocated to tension from main span length loading.

In addition, the mid-span clamp and support system discussed herein includes a drop cable clamp coupled to the mid-span clamp via a rotational coupling. The rotational coupling allows the drop cable clamp and drop cable extending from the mid-span location to rotate freely relative to the mid-span clamp under various loading conditions (i.e., dead weight, wind, ice and combinations thereof) to allow the drop cable to bend about the preferential axis (minor area moment of inertia axis) thereby minimizing bending strain in the drop cable.

FIG. 1 is top schematic view of a mid-span optical fiber cable support system 10 according to an exemplary embodiment. In general, system 10 includes a main span cable 12 that includes a span section 14 located between connections at two supports 16 and 18. Supports 16 and 18 may be aerial support structures such as utility poles, and in specific embodiments, main span cable 12 is an all-dielectric self-supporting (ADSS) cable, as shown for example in FIG. 2.

Figure 2:
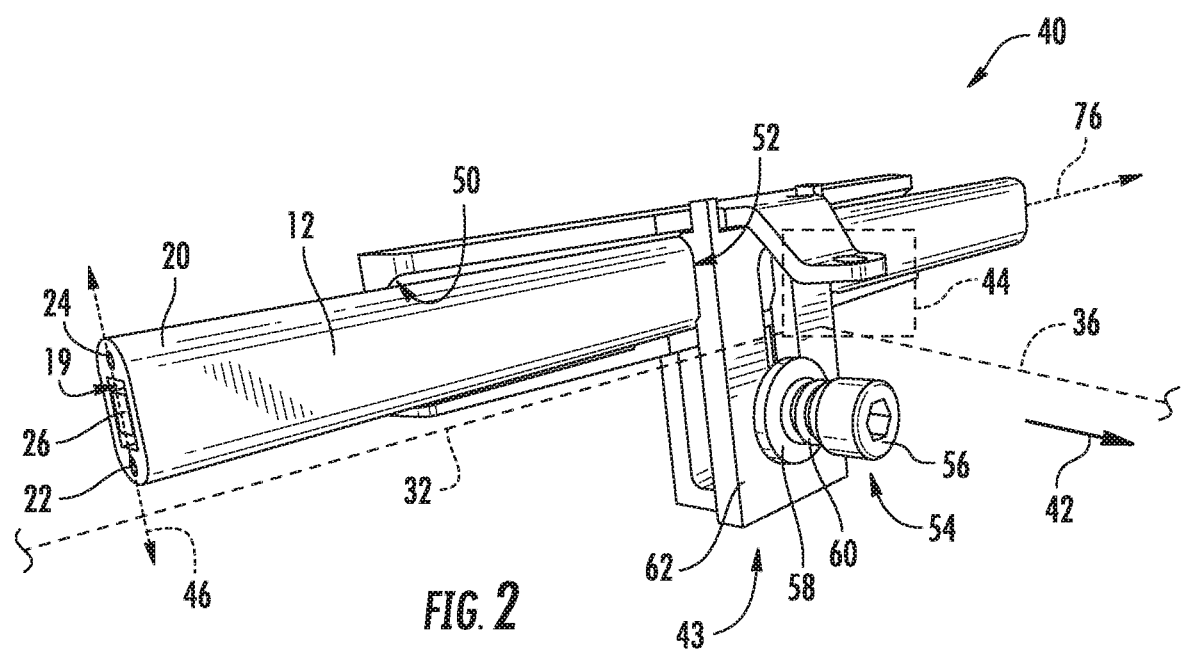
FIG. 2 is a perspective view of a mid-span clamp system according to an exemplary embodiment.

As shown in more detail in FIG. 2, main span cable 12 is a non-cylindrical cable having preferential bend characteristics. Specifically, main span cable 12 includes a central cavity 19 defined within an oblong outer cable jacket 20. First and second strength members 22 and 24 are located within (e.g., embedded within) cable jacket 20 on either side of cavity 19, and in this arrangement main span cable 12 defines a preferential bend axis 46 (e.g., a minor area moment of inertia axis) that intersects the center points of strength members 22 and 24 and that also traverses central cavity 19. Main span cable 12 includes one or more optical fibers 26 (e.g., optical fiber ribbon(s), optical fiber ribbon stack(s), buffer tube with loose optical fibers, etc.) located within cavity 19.

Mid-span optical fiber cable support system 10 also includes a drop cable 30. As will be understood, drop cable 30 includes one or more optical fiber (typically having less optical fibers than main span cable 12). In general, drop cable 30 has a first section 32 that extends along or parallel to a portion of main span cable 12 from a splice point 34 at which optical fiber(s) of drop cable 30 is spliced to optical fiber(s) of main span cable 12. In the embodiment shown, splice point 34 is supported on utility pole 16. Drop cable 30 also includes a second portion 36 which extends outward away from main span cable 12 at a mid-span location to provided network services to an end user 38 (e.g., a home, business, etc.). As used herein mid-span location relates to a position along main span cable 12 that is at least 10% of the length main span cable 12 between support poles 16 and 18. In a specific embodiment as shown in FIG. 1, the mid-span location is generally located at the middle of the portion of main span cable 12 between support poles 16 and 18.

Referring still to FIG. 1, mid-span optical fiber cable support system 10 also includes a mid-span clamp system 40. In general, mid-span clamp system 40 has a first clamp that engages main span cable 12 at the desired mid-span locate, and second clamp (e.g., a p-clamp, a wedge clamp, etc.) that engages the drop cable. As generally shown in FIG. 1, the mid-span clamp system 40 is configured to both support first section 32 of drop cable 30 generally along main span cable 12, and to also support second section 36 of drop cable 30 as it extends away (e.g., in a horizontal direction) from main span cable 12.

For reference as shown in FIG. 1, directing second section 36 of drop cable 30 away from main span cable 12 tends to apply a lateral load represented by arrow 42 to main span cable 12, which tends to deflect main span cable 12 from its unloaded, natural path between supports 16 and 18 shown as dotted line 41. As will be explained in more detail, the loading represented by arrow 42 tends to cause bending strain within the strength members of main span cable 12, and in the embodiments discussed herein, mid-span clamp system 40 is configured, arranged and shaped to limit/reduce the bend strain that would otherwise be experienced by main span cable 12.

Referring to FIG. 2, mid-span clamp system 40 is shown in more detail. In general, mid-span clamp system 40 includes a main span cable clamp 43 configured to engage the outer surface of main span cable 12 at a mid-span location, and a drop cable clamp 44 (shown schematically in broken lines) that supports drop cable 30 allowing second section of drop cable 36 to extend away from main span cable 12 in the direction of end user 38.

As can be seen best in FIG. 2, mid-span clamp system 40 is arranged such that drop cable section 36 extends away from main span cable 12 in a direction substantially perpendicular (e.g., 90 degrees plus or minus 10%) to the preferential bend axis 46 of main span cable 12. Applicant has found that by orienting drop cable section 36 and the load 42 such that they are substantially perpendicular to preferential bend axis 46, bend strain within main span cable 12 may be reduced. As will be noted in this arrangement, mid-span clamp system 40 is oriented such that preferential bend axis 46 is positioned in a substantially vertical direction (e.g., with plus or minus 15 degrees from vertical, and drop cable section 36 extends in a substantially horizontal direction away from main span cable 12.

As noted above, in addition to the low bend strain orientation of drop cable section 36 relative to preferential bend axis 46, main span cable clamp 43 is also designed to limit bend strain that may otherwise be experienced because of the interface between main span cable clamp 43 and main span cable 12 due to drop cable loading 42. Referring to FIGS. 2-5, the portion of main span cable clamp 43 (shown in FIG. 2) that includes a first engagement surface 50 and a second engagement surface 52 that opposes the first engagement surface 50. As shown first engagement surface 50 generally faces toward drop cable clamp 44, and second engagement surface 52 generally faces away from drop cable clamp 44. To secure mid-span clamp system 40, first engagement surface 50 engages the outer surface of one side of main span cable 12, and second engagement surface 52 engages the outer surface of the other side of main span cable 12 such that main span cable 12 is clamped between engagement surfaces 50 and 52.

To secure the engagement between engagement surface 50 and 52 and main span cable 12, mid-span clamp system 40 includes a locking or tightening system 54. In general, locking system 54 includes a cap screw 56, washer 58 and spring 60 (e.g., a helical spring, a Belleville spring stack, etc.). To securely clamp, engagement surface 50 and 52 to main span cable 12, cap screw 56 is advanced through retaining plate 62 to a threaded receiving hole. Spring 60 acts to maintain clamping force on the cable throughout temperature changes and relaxation of the cable.

Figure 3:
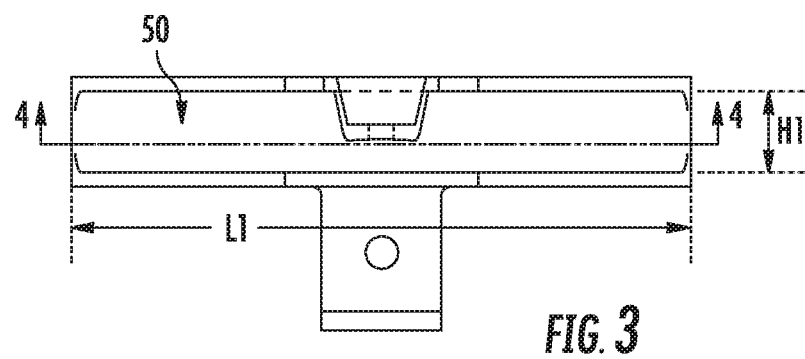
FIG. 3 is a front plan view of a mid-span clamp system component defining a curved cable engagement surface according to an exemplary embodiment.
Figure 4:
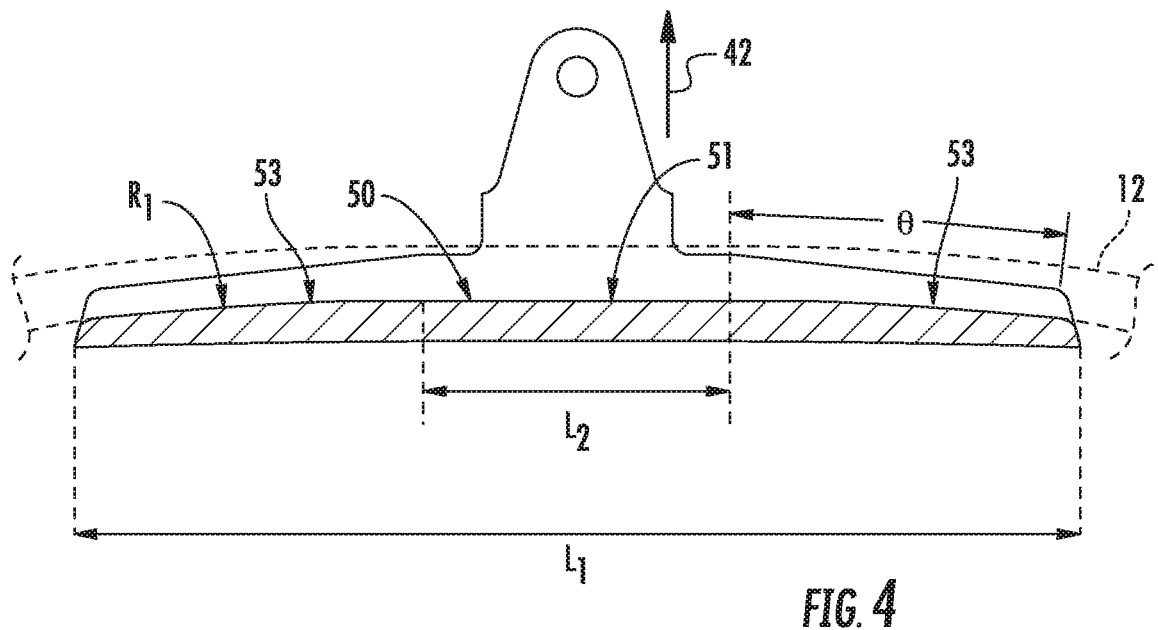
FIG. 4 is a cross-sectional view showing a curved cable engagement surface according to an exemplary embodiment.
Figure 5:
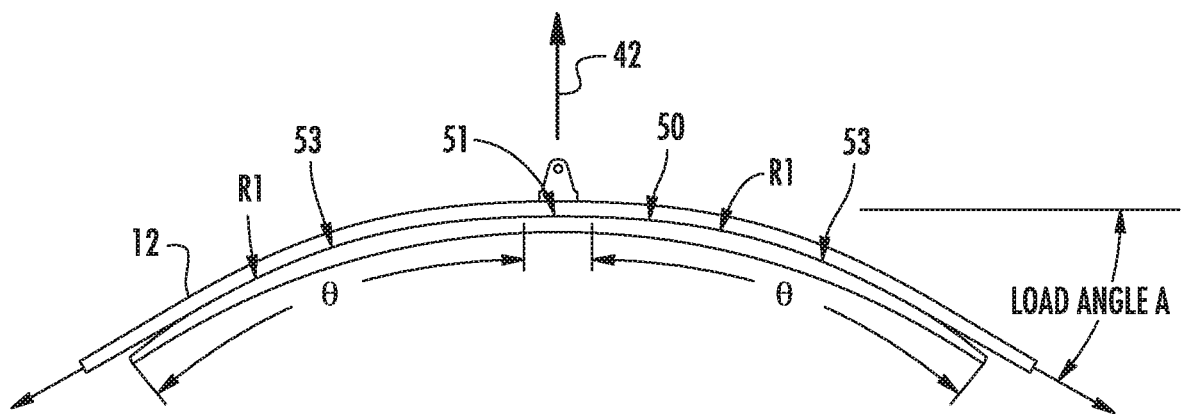
FIG. 5 is a schematic view showing a main span cable engaged with a curved cable engagement surface under mid-span drop cable loading according to an exemplary embodiment.

Referring to FIGS. 3-5, the shape and geometry of engagement surface 50 that provides low bend strain engagement to main span cable is described in more detail. As shown in FIG. 3, engagement surface 50 has a height H1, and a length L1 that is greater than H1. In general, H1 is selected to closely match the height of main span cable 12 (e.g., dimension along preferential bend axis 46). In addition to the curved surface discussed herein, engagement surface 50 includes a central flat section 51, having a length L2 shown in FIG. 4, and flat section 51 is flanked by a pair of curved surfaces 53 having the curvature discussed herein. Length L1 is selected to provide an engagement surface 50 of sufficient length to provide the level of curvature discussed below. In various embodiments, H1 is between 16 mm and 20 mm, specifically between 17 mm and 18 mm, and L1 is between 100 mm and 170 mm and specifically between 125 mm and 135 mm.

Referring to FIGS. 4 and 5, main span clamp 43 is arranged such that length L1 of engagement surface 50 is substantially parallel to the longitudinal axis of main span cable 12 (shown in broken lines in FIG. 4). In addition, as shown in FIG. 4, engagement surface 50 is generally curved in the length direction and is convex relative to at least the loading vector of drop cable section 36 represented by arrow 42. For illustration purposes, FIG. 5 exaggerates the curvature of engagement surface 50. As shown in FIG. 5, the curvature of engagement surface 50 is defined by a radius curvature R1 and an angle θ. As shown, angle θ is angle measured from the tangent between the center flat section and curved section of surface 50 and one of the ends of surface 50.

In general, in order to limit bend stress experienced by main span cable 12 under loading (e.g., lateral loading 42 from drop cable section 36) the angle θ of curved surfaces 53 of engagement surface 50 must be greater than the load angle A induced in main span cable 12 due to the maximum lateral loading (e.g., the maximum tension of drop cable section 36 experienced). By ensuring that angle θ of surfaces 53 is greater than the load angle A for all loading conditions, main span cable 12 is tangential to the curved surface 53 somewhere along its length ensuring adequate support of main span cable 12 and reducing bending strain that may be experienced under other clamp designs. In various embodiments, R1 is between 100 mm and 500 mm and specifically between 350 mm and 400 mm, and θ is between 3 degrees and 10 degrees and specifically between 4 degrees and 7 degrees. In a specific embodiment, R1 and angle θ are selected such that bending strain within main span cable 12 does not exceed 0.3%.

By way of example, FIG. 6 shows a clamp surface having a curvature that is insufficient to limit bend strain. As shown in FIG. 6, when the curvature of the engagement surface is less than the load angle A, an abrupt transition 64 in the angle of main span cable 12 occurs as main span cable exits the clamp. This sharp bend transition causes high bending strain in the main span cable 12. Thus, by comparing FIG. 6 to FIG. 5, the decrease in bend strain provided by curved surface 50 can be seen.

By way of background, the allowable span for ADSS cables with glass reinforced strength members is based on the membrane plus bending strain limit of the strength members for the worst case loading condition:

$$T/AE + r/R \leq \varepsilon \qquad \text{Eq. 1}$$

Where:

A—is the total cross sectional area of the strength members

E—is Young's Modulus of the strength members r—is the radius of the strength members (for circular cross section strength members)

R—is the bend radius of the cable

T—is main span tension

ε—is the allowable strain of the strength members

To maximize the allowable span length of the main span cable located between supports 16 and 18, bending strain imposed on the main span cable 12 by drop cable 30 at mid-span clamp system 40 should be limited to a fraction of the allowable strain of the strength members of main span cable 12. By minimizing bending strain at the drop cable connection through the design of curved engagement surface 50 discussed herein, more of the allowable strain is available for main span tension thereby permitting longer span length for given loading conditions. In addition, the design of curved engagement surface 50 discussed herein controls the strength member bending strain in the main span cable to below a prescribed value regardless of drop span tension by limiting the bend radius of the main span cable to R1 within mid-span clamp system 40 due to the engagement between surface 50 and main span cable 12.

Referring to FIGS. 7-9, mid-span clamp system 40 includes additional structures that further facilitate reduction of strain due to mid-span drop cable attachment. For example, in various embodiments, mid-span clamp system 40 is configured to position drop cable clamp 44 (and consequently drop cable span 36 and the associated load) relative to main span cable 12 in manner that reduces bend strain and/or torsion. In general, mid-span clamp system 40 holds main span cable 12 and drop cable span 36 in position relative to each other such that drop span cable load 42 are normal to the preferential bend axis 46 which acts to reduce/prevent undesirable rotation of the main span cable 12 about its longitudinal axis as it seeks to bend about its preferential axis. Without such alignment between the preferential bend axis 46 and the drop cable load 42, the undesirable rotation can introduce additional strain in the strength members of the main span cable thereby reducing the allowable span length.

Referring to FIG. 7, in one embodiment, mid-span clamp system 40 includes a support bracket 70 that extends outward and perpendicularly away from engagement surface 50. An eyelet 72 is located at one end of support bracket 70 and is coupled to drop cable clamp 44 such that drop cable clamp 44 and drop cable span 36 are positioned relative to main span cable 12 and engagement surface 50 as discussed herein.

In various embodiments, support bracket 70 is shaped such that the drop cable load vector 42 experienced at eyelet 72 and the central longitudinal axis 76 lie in a plane that is perpendicular to preferential bend axis 46 (see FIG. 2) of main span cable 12. It is believed that by reducing eccentricity between the eyelet 72 (and consequently the drop cable load 42 experienced at eyelet 72) and the central longitudinal axis 76 of main span cable 12, the bending moment resulting from the drop cable forces 42 transferred to the eyelet 72 are reduced.

Thus, in specific embodiments, support bracket 70 supports drop cable clamp 44 such that the drop cable load 42 is positioned to be perpendicular to preferential bend axis 46. In specific embodiments, eyelet 72 is positioned such that drop cable span 36 and the drop cable load 42 is experienced between uppermost and lowermost edges (in the orientation of FIG. 7) of engagement surface 50. In one such arrangement, support bracket 70 is shaped with an angled section 74 that positions drop cable clamp 44 such the drop cable load vector lies on the plane bisecting engagement surface 50. In this arrangement, support bracket 70 is shaped such that the drop cable span 36 is positioned relative to main span cable 12 such that the drop cable load 42 intersects preferential bend axis 46 at 90° midway between edges of the main span cable 12.

In addition, as shown in FIG. 7, eyelet 72 is positioned such that drop cable clamp 44 and drop cable span 36 are spaced a horizontal distance D1 from engagement surface 50. In various embodiments, D1 is a short distance to limit the bending moment experienced by main span cable 12 from vertical components drop cable load 42. In various embodiments D1 is between 25 mm and 40 mm and more specifically between 28 mm and 35 mm.

Referring to FIG. 8 and FIG. 9, second engagement surface 52 is shown located on plate 62. In one embodiment, surface 52 may be knurled or include a roughened texture to facilitate a tight grip onto the outer surface of main span cable 12. In addition, plate 62 includes a generally vertical slot 80 that is sized to receive cap screw 56 and permit plate 62 to translate relative to main span cable clamp 43 to install on the main span cable 12 prior to tightening cap screw 56 discussed above regarding FIG. 2.

In various embodiments, drop cable clamp 44 may include one or more suitable clamping structure along with a rotatable or flexible linkage joining drop cable clamp 44 to eyelet 72. In various embodiments, drop cable clamp 44 may be a P-clamp or a wedge clamp coupled to eyelet 72. In one embodiment, the bail of drop cable clamp 44 is flexible and/or rotatable to permit drop cable 30 to rotate about its axis so it can align its preferential bend direction for all loads or combined loads (i.e. deadweight, wind, ice). In another embodiment, an additional linkage or a swivel can be provided that allows drop cable 30 to rotate up to 160 degrees about the drop cable 30's longitudinal axis.

In another embodiment, drop cable clamp 44 is integral with support bracket 70. In such embodiments, the integral drop clamp 44 allows rotation about both axes orthogonal to main span longitudinal axis 76 to minimize bending strain in both the main span cable 12 and drop cable 30. In yet another embodiment, drop cable clamp 44 utilizes a revolute joint to transfer the drop span load 42 to the main span cable 12 while permitting the main span cable 12 to rotate about its axis to self-align the preferential bend axis 46 of the cable.

In various embodiments, mid-span clamp system 40 is configured to be attached onto main span cable 12 from a position (e.g., the ground) located below the main span cable 12. In such embodiments, clamp system 40 may include biasing element(s) that urge engagement surfaces 50 and 52 onto main span cable 12. In a specific embodiment, a tool is provided that engages the biasing element such that surfaces 50 and 52 are held apart while mid-span clamp system 40 is positioned around main span cable 12 from the ground. When in place, the tool releases the biasing element, allowing the biasing element to force surfaces 50 and 52 into engagement with the outer surface of main span cable 12. In a specific embodiment, the biasing element is integral with the material of the plates defining surfaces 50 and 52. In another embodiment, the biasing element is integral with the material of bracket 70. In another embodiment, the biasing element is a spring that engages at least one of bracket 70 and/or the plates defining surfaces 50 and 52.

Example 1

In one specific example, the length of main span cable 12 between supports 16 and 18 is 50 m, with a 2% sag. The length of second section 36 of drop cable 30 is 20 m which is attached to the main span cable 12 midway between supports 16 and 18. In this arrangement allowing for deadweight loading, wind loading and NESC heavy ice loading, the load angle is approximately 3.2 degrees. Thus, for these loading conditions angle θ is greater than 3.2 degrees and more specifically is between 4 degrees and 10 degrees. Applicant has found that given these conditions and with radius $R_1$ greater than or equal to 380 mm, the total strain experienced by strength members 22 and 24 remains below the allowable strain limits of approximately 1% and well below ultimate strain limits of 2.5% minimum.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A bend-strain reducing mid-span drop cable support system comprising
   a main span cable clamp, comprising:
      a first engagement surface; and
      a second engagement surface opposing the first engagement surface such that a body of a main span cable is engageable between the first and second engagement surfaces; and
   a drop cable clamp supported from the main span cable clamp, the drop cable clamp configured to support a drop cable in a position extending away from the first engagement surface;
   wherein the first engagement surface has a height and a length greater than the height, wherein the first engagement surface is a curved surface, convex relative to the drop cable clamp, and defines a radius of curvature R1 and an angle θ, wherein R1 is between 100 mm and 500 mm, and θ is between 3 degrees and 10 degrees.

2. The bend-strain reducing mid-span drop cable support system of claim 1, wherein R1 is between 350 mm and 400 mm, and θ is between 4 degrees and 7 degrees.

3. The bend-strain reducing mid-span drop cable support system of claim 1, wherein the main span cable clamp is shaped such that the convex curve of the first engagement surface is convex relative to the second engagement surface.

4. The bend-strain reducing mid-span drop cable support system of claim 1, further comprising a support bracket extending outward and perpendicularly away from the first engagement surface, the support bracket coupling the drop cable clamp to the main span cable clamp, the support bracket shaped such that the drop cable clamp is located below an upper edge of the first engagement surface and above a lower edge of the first engagement surface.

5. The bend-strain reducing mid-span drop cable support system of claim 4, wherein the support bracket is shaped such that a plane within 15 degrees of horizontal bisecting the first engagement surface intersects the drop cable clamp.

6. The bend-strain reducing mid-span drop cable support system of claim 5, wherein the support bracket is shaped such that the drop cable clamp is located a distance D1 from the first engagement surface, and D1 is between 25 mm and 40 mm.

7. A mid-span drop cable support system comprising
   a main span cable clamp, comprising:
      a first engagement surface having a height and a length greater than the height, wherein the first engagement surface includes a convex curved section; and
      a second engagement surface opposing the first engagement surface;
   a support bracket extending outward and perpendicularly away from the first engagement surface; and
   a drop cable clamp supported from the support bracket;
   wherein the convex curved section is convex relative to the drop cable clamp;
   wherein the support bracket is shaped such that the drop cable clamp is located below an upper edge of the first engagement surface and above a lower edge of the first engagement surface.

8. The mid-span drop cable support system of claim 7, wherein the support bracket is shaped such that the drop cable clamp is located a distance D1 from the first engagement surface, and D1 is between 25 mm and 40 mm wherein the convex curved surface of the first engagement surface defines a radius of curvature R1 and an angle θ, wherein R1 is between 100 mm and 500 mm, and θ is between 3 degrees and 10 degrees.

9. The bend-strain reducing mid-span drop cable support system of claim 1, wherein the first engagement surface generally faces towards the drop cable clamp.

10. The mid-span drop cable support system of claim 7, wherein the first engagement surface generally faces towards the drop cable clamp.

* * * * *